Oct. 21, 1952    J. L. McCORD    2,614,318
TOOL FOR EXTRACTING BUSHINGS
Filed July 24, 1950
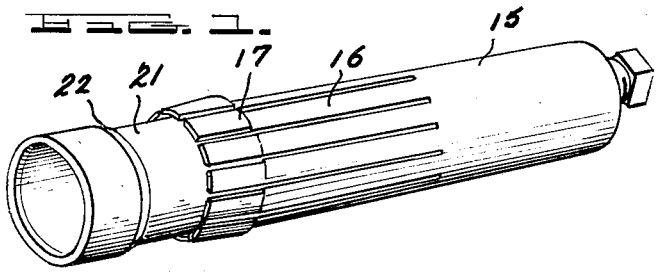
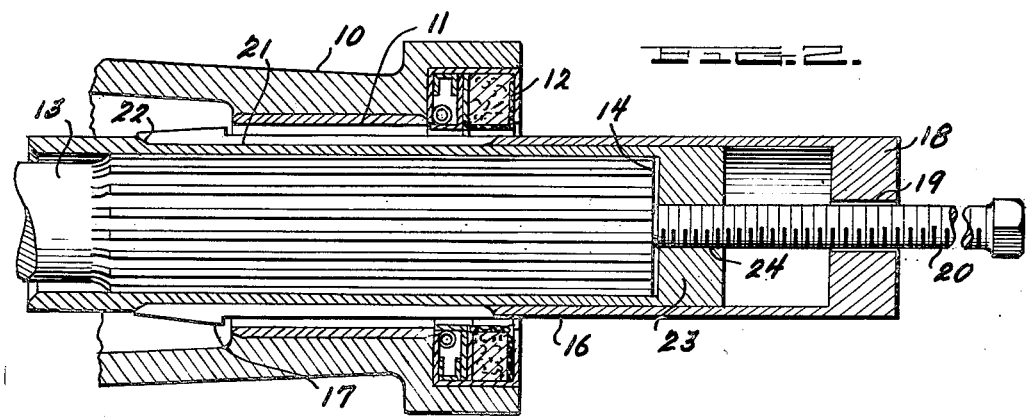
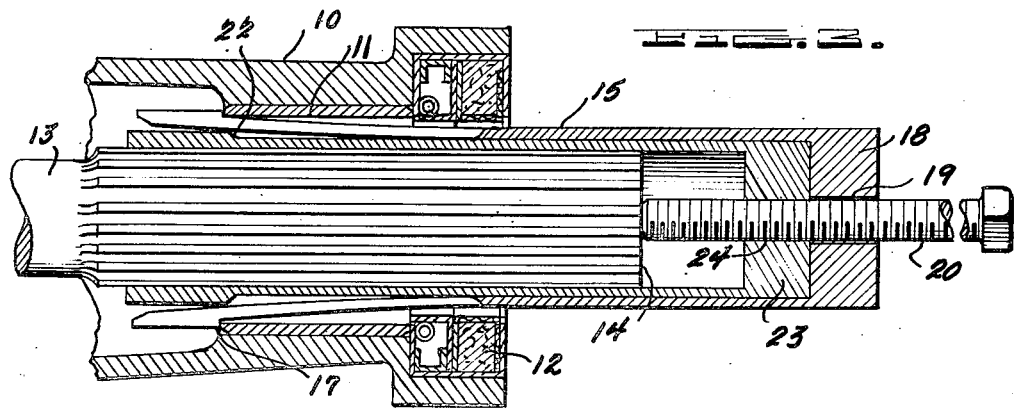
INVENTOR.
JESSE L. McCORD
BY
Adams + Bush
ATTORNEYS Patented Oct. 21, 1952

2,614,318

UNITED STATES PATENT OFFICE 2,614,318

TOOL FOR EXTRACTING BUSHINGS

Jesse Lee McCord, Covington, Ga.

Application July 24, 1950, Serial No. 175,595

3 Claims. (Cl. 29—263)

This invention relates to tools for extracting bushings in automobile transmission housings and the like. Among other objects, the principal aim is to provide a greatly improved bushing extractor adapted for use in making repairs on certain makes of automobiles, wherein a main shaft from the transmission projects through a tubular housing and is adapted to be connected to a propeller shaft leading to the differential.

The main object of the invention is to provide a novel bushing extractor of the type described, which is especially contrived to remove bearing bushings from the tubular extensions on transmission housings without the necessity of dismantling such extensions and thereby saving considerable time and expense in the operation.

Still another aim of the invention is to provide a bushing extractor of the type described which is relatively simple in construction and can easily be applied to the intended use.

Other aims and advantages of the invention will appear in the specification, when considered in connection with the accompanying drawing, wherein:

Fig. 1 is a perspective view of a bushing extractor embodying the invention;

Fig. 2 is a sectional view showing the extractor about to be applied to a bushing in the extension tube of an automobile transmission; and Fig. 3 is a view similar to Fig. 2, showing the extractor expanded into engagement with the inner end of the bushing.

Referring particularly to the drawing, the extractor is especially designed to remove bearing bushings and oil seals from the rear end of transmission tubes through which a main shaft from the transmission projects. New models of Ford and Mercury automobiles are provided with such a tubular housing 10 carrying a bearing bushing 11 and oil seal 12 at the rear end. A main, drive shaft 13 having a splined end 14 projects through the rear end of the tubular housing and a propeller shaft (not shown) having a hollow, splined forward end is adapted to be telescoped on the splined end 14 of the main shaft. The propeller shaft is adapted to be removed to afford access to the rear end of the transmission tube. It has a smooth bearing surface which is adapted to engage the bearing bushing 11. The bearing bushing is split and is adapted to be forced into place under considerable pressure. Likewise, the oil seal 12 is driven into tight, frictional engagement with the counterbore in the end of the transmission tube. The bushing extractor is adapted to remove both the bushing and the oil seal, without necessitating dismantling of the transmission tube from the transmission housing. The job of removing such bushings, by dismantling the transmission tube, usually requires several hours of laborious work. The reason for this has been that there was no available tool capable of insertion through the small annular space between the splined end 14 of the main shaft and the bushing. This space is about $\frac{1}{16}''$ wide.

In accordance with this invention, there is provided an extractor in the form of a cylindrical tube or sleeve 15 having a plurality of elongated, spring fingers 16 with shoulders 17 at their forward ends adapted to be inserted in the tubular housing to engage the inner end of the bushing 11. This cylindrical member is shown as having a closed outer end 18 with an axial opening 19 adapted to receive a power screw 20 in the form of a set screw with a square head.

An expander, in the form of a cylindrical sleeve 21, is telescoped within the cylindrical extractor 15 and has a tapered expanding head 22 at its inner end adapted to engage the tapered, inside walls of the ends of the fingers 16 to expand the fingers, so that they will engage the inner end of the bushing. The outer end of the expander tube is shown as having a head 23 with a screw threaded bore 24 adapted to be engaged by the power screw 20. The length and size of the tubular expander are such that it can be telescoped over and slid home onto the rear end of the splined portion 14 of the main shaft with its closed end engaging the end of the main shaft. Also, the expander head 22 projects beyond the ends of the spring fingers 16 and the overall thickness of both of the cylindrical sleeve members, with the spring fingers contracted, as clearly shown in Fig. 2, is such that both of the members can be slid into place through the annular space between the main shaft and the extension tube, ready for the fingers to be expanded. It is desirable to make the depth of the tubular expander just sufficient to allow the shoulders on the collapsed or contracted spring fingers of the telescoped extractor to clear the inside edge of the bushing.

As will be seen in Fig. 2, the power screw 20 is threaded through the head 23 of the expander sleeve or tube, so that it will engage the outer splined end of the main shaft 13. The extractor sleeve is shown as being telescoped on the expander sleeve with the ends of the fingers contracted adjacent to the expander head 22. When the extractor is thus inserted, the fingers are then expanded, so that their shoulders will engage the inner end of the bushing. This is accomplished by holding the outer, closed end of the extractor sleeve or cylinder and exerting manual pulling pressure on the power screw, thereby pulling the expander sleeve into the position shown in Fig. 3, with the head telescoped within the ends of the spring fingers 16. Incidentally, the taper of the expander head is such that it will not expand the fingers any more than the thickness of the bushing 11.

When the parts are in the position shown in Fig. 3, it is only necessary to turn the power screw 20 with a wrench to exert pulling or extracting pressure on the bushing. The outer end of the bushing engages the inside wall of the oil seal and continued turning of the screw will remove both the bushing and the oil seal.

Actual use of this type of tool has resulted in a great saving of time and laborious and expensive work entailed in removing such bushings. In fact, such bushings have been removed within a matter of twenty minutes or less; whereas, the time required for dismantling the transmission tube and removing a bushing in accordance with the usual practice requires as much as four hours.

Obviously, the invention is not restricted to the particular embodiment thereof herein shown and described but is capable of many changes within the scope of the appended claims.

What is claimed is:

1. A tool for removing bushings from automobile transmission housings and the like, comprising a thin, cylindrical extractor sleeve having a plurality of elongated spring fingers at one end; external shoulders formed on the free end portions of said fingers adapted to be expanded to engage the end of a bushing to be removed; a cylindrical expander telescoped in said extractor sleeve having a tapered head to engage said spring fingers and adapted to be telescoped on a shaft spaced from and projecting through the bushing and then pulled into expanding engagement with the fingers; a closed end member on the expander sleeve having an axial screw threaded opening therein; stop means carried by the extractor sleeve positioned to limit the expanding movement of said expander sleeve; and a power screw extending freely through the outer end of said extractor sleeve and said screw threaded opening adapted to engage the end of the shaft projecting through the bushing to apply extracting pressure through the expander sleeve and said stop means to the extractor sleeve thereby remove the bushing.

2. A tool for removing bushings, as set forth in claim 1, wherein the length of the cylindrical expander sleeve is such that its closed end will engage the end of the projecting shaft when the sleeves are pushed home with the shoulders on the spring fingers in position to be expanded by manipulating the sleeves.

3. A tool for removing bushings, comprising a cylindrical, extractor sleeve having elongated fingers with external shoulders adjacent to one end; a cylindrical expander sleeve telescopically mounted in the extractor sleeve and adapted to be telescopically mounted on a shaft projecting through a bushing to be extracted; a head on the outer end of the expander sleeve having an axial screw threaded opening; an end closure member on the extractor sleeve having an axial opening; and a power screw extending freely through the opening in the closed end of the extractor sleeve and threaded through the axial opening in the expanded head adapted to engage the outer end of the shaft extending through the bushing to exert extracting pressure thereon when the head on the expander sleeve engages the end closure member on the extractor sleeve.

JESSE LEE McCORD.

REFERENCES CITED

The following references are of record in the file of this patent:

UNITED STATES PATENTS

| Number | Name | Date |
|---|---|---|
| 1,318,137 | Dunlap | Oct. 7, 1919 |
| 1,573,572 | Rees | Feb. 16, 1926 |
| 1,654,310 | Reiter | Dec. 27, 1927 |

FOREIGN PATENTS

| Number | Country | Date |
|---|---|---|
| 427,850 | Germany | Apr. 15, 1926 |